United States Patent [19]

DiBono

[11] Patent Number: 4,946,010
[45] Date of Patent: Aug. 7, 1990

[54] TELEPHONE CORD RETRACTION DEVICE

[76] Inventor: Peter A. DiBono, 25 Santa Ana Ave., San Francisco, Calif. 94127

[21] Appl. No.: 331,274

[22] Filed: Mar. 30, 1989

[51] Int. Cl.⁵ ............................................ H02G 11/00
[52] U.S. Cl. ............................................... 191/12.2 R
[58] Field of Search ...................... 191/12.2 R, 12.2 A, 191/12.4, 12.2; 242/107.7; 74/575, 111; 411/89, 125

[56] References Cited

U.S. PATENT DOCUMENTS

| | | | |
|---|---|---|---|
| 1,116,402 | 11/1914 | Ferguson | 191/12.2 R |
| 2,521,178 | 9/1950 | Meletti | 191/12.2 R |
| 4,384,688 | 5/1983 | Smith | 191/12.2 R |

Primary Examiner—Andres Kashnikow
Assistant Examiner—Virna Lissi Mojica
Attorney, Agent, or Firm—Owen, Wickersham & Erickson

[57] ABSTRACT

A telephone cord retraction device adapted for connection between a fixed telephone terminal and a movable telephone set comprises a housing with a fixed conductor extending from the housing and adapted for connection with the telephone terminal. An extendable cord stored on a rotatable spool within the housing has an outer end which is connectable to a telephone set. Within the housing, connection elements provide electrical continuity between the fixed conductor and the extendable cord on the spool. A spring motor is connected to the spool for urging it in one rotational direction to provide wind-up tension on the extendable cord. Cooperating spool control elements in the housing operate to temporarily hold the spool stationary within the housing against the force of the spring motor and alternatively to release the spool to allow the motor to rotate it and thereby wind-up the cord.

5 Claims, 3 Drawing Sheets

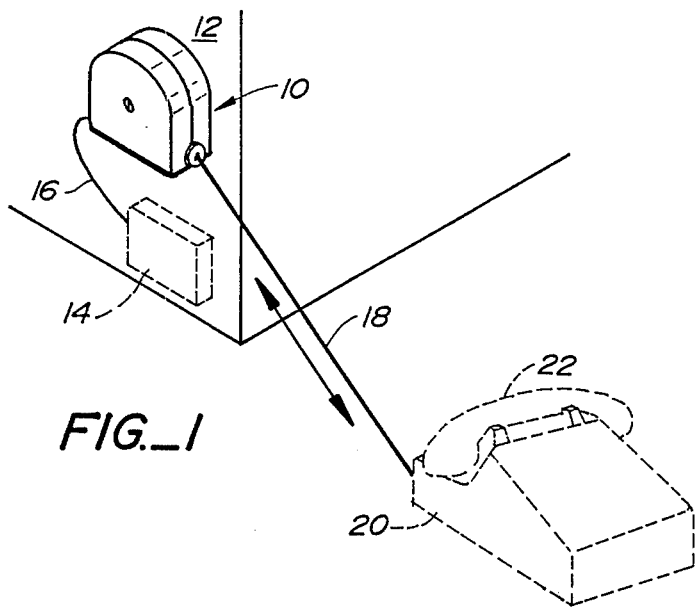
FIG._1
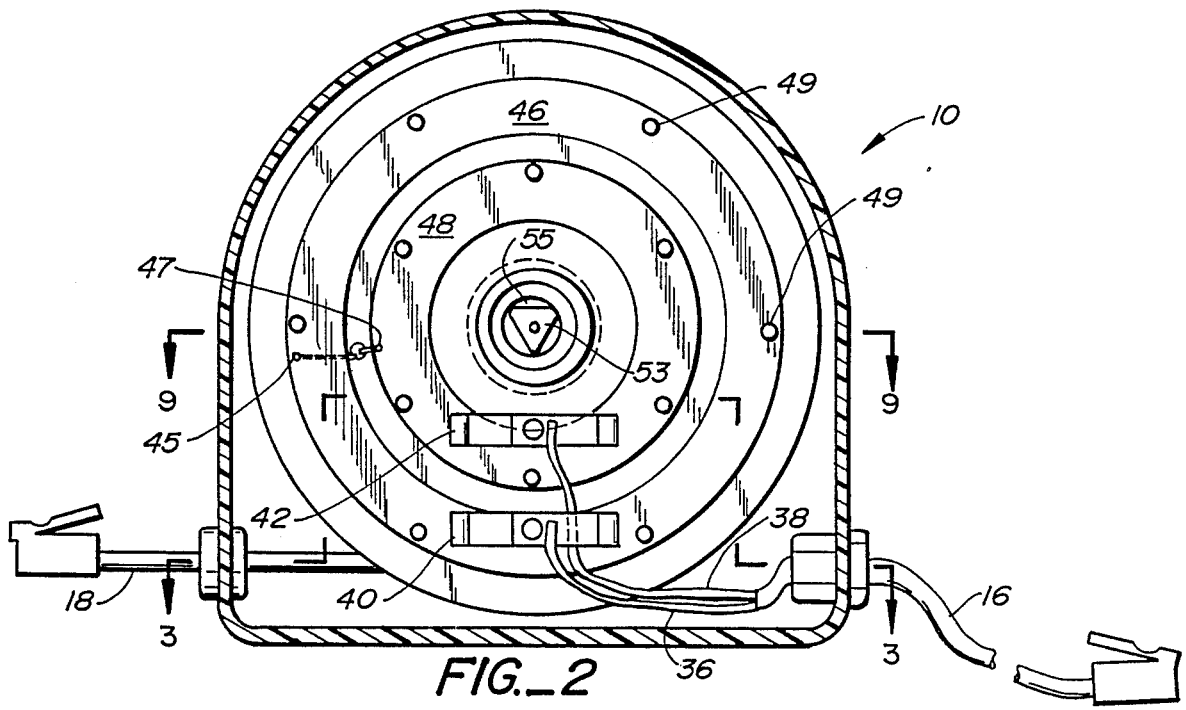
FIG._2
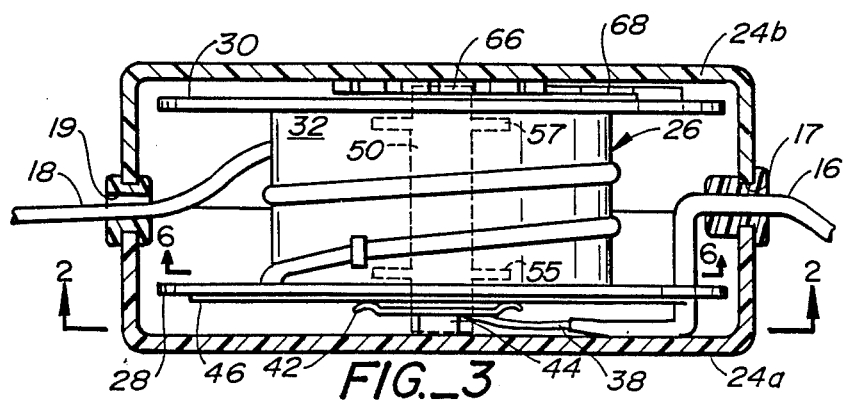
FIG._3

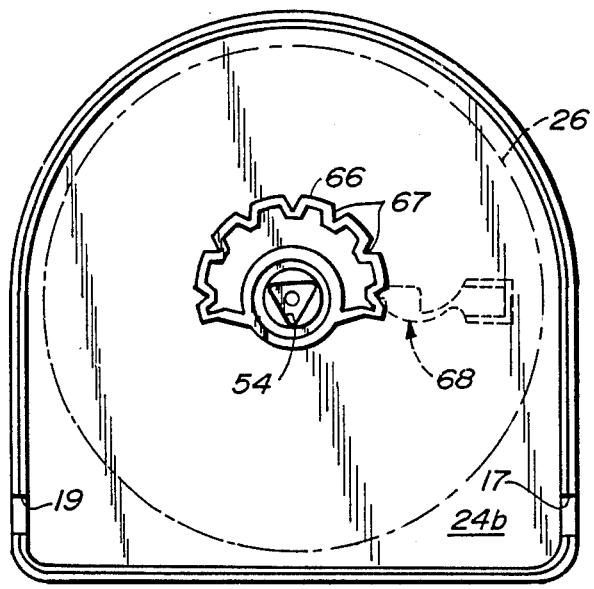
FIG._4
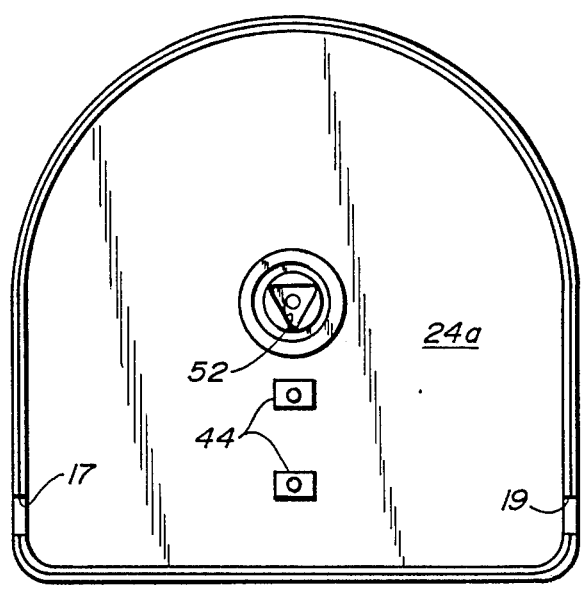
FIG._5
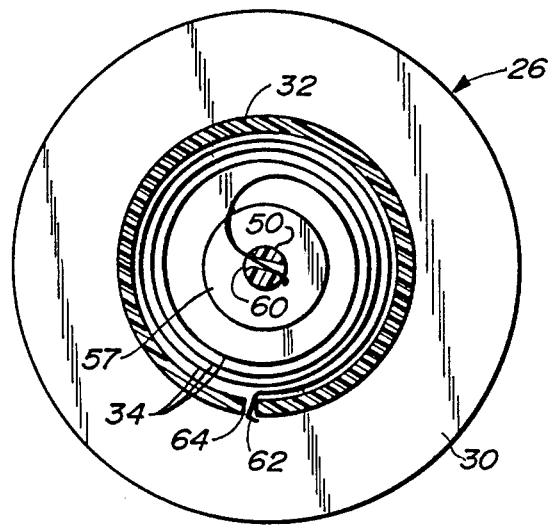
FIG._6
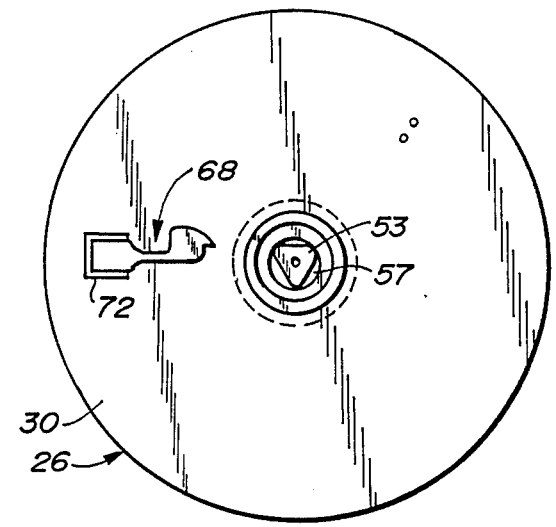
FIG._7
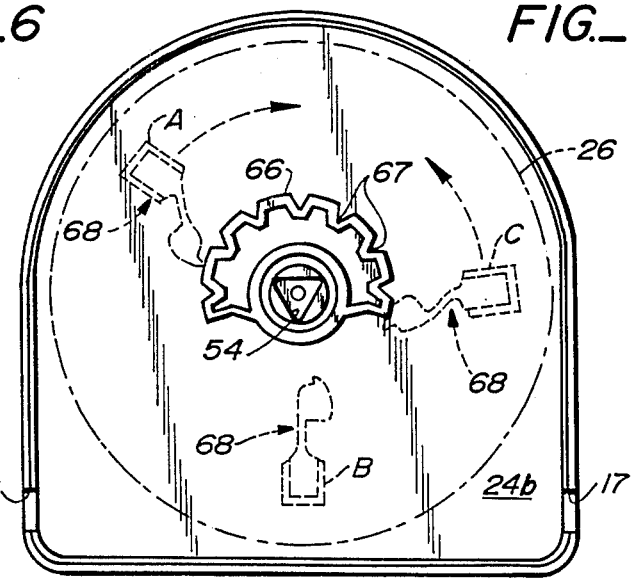
FIG._8

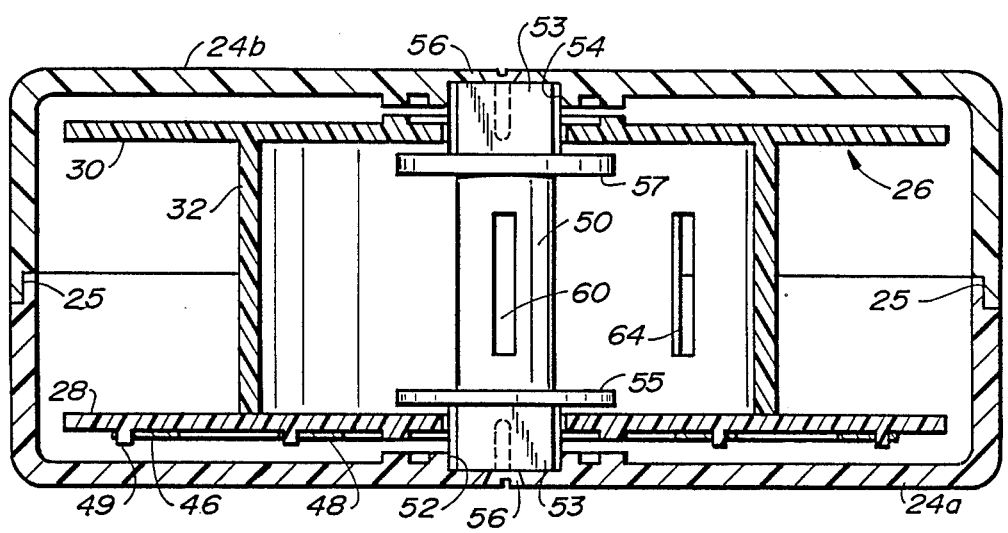
FIG._9
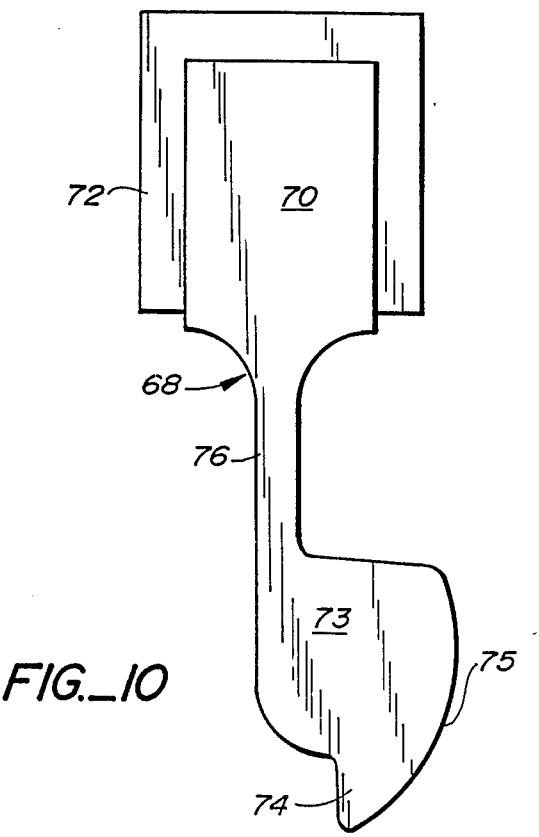
FIG._10

TELEPHONE CORD RETRACTION DEVICE

This invention relates to an improved cord retraction device particularly adapted for use with a handheld telephone set.

BACKGROUND OF THE INVENTION

A large number of conventional telephone sets comprise a base and a handheld mouthpiece/receiver or handset connected by a flexible cord to the base such as the well known spiral or spring cord. The base is normally connected to a fixed telephone jack by a cord or wire of a fixed predetermined length. Thus, the telephone base was intended to remain in a fixed location limited by the length of the cord interconnecting the base and the jack. The flexible cord between the telephone base and its handset afforded the user only a relatively small degree of mobility when using the telephone. For example, if the telephone user wished to cross the room to take advantage of more comfortable furniture or to obtain some information relative to the telephone conversation, the relatively short spiral cord between telephone base and handset was inadequate.

A general object of the present invention is to provide a solution to the aforesaid problem by means of an automatic cord windup or retraction device that can be readily connected to a telephone jack and to the base of a telephone set, thereby making it possible for a user to move the telephone for a considerable distance (e.g. 30 feet) within a room.

Another object of the invention is to provide a telephone cord retraction device that is compact, easy to install and capable of withstanding consistent use over a long period of time.

Another object of the invention is to provide a telephone cord retraction device that is particularly well adapted for ease and economy of manufacture.

Still another object of the invention is to provide a telephone cord retraction device that will enable the cord to be manually extended from and returned to a storage drum while maintaining electrical contact with the drum so as to maintain clear telephonic transmissions at all times.

SUMMARY OF THE INVENTION

In accordance with the invention a telephone cord retraction device is provided which comprises a two-piece housing that contains a rotatable spool surrounding a spiral spring motor. The extensible cord is attached to and wound about the spool which has a shaft that is supported at both ends by elements on the inside of the housing. The spring is attached to the spool so that even when the cord is fully wound on the spool, the spring is under a minimal but positive amount of tension or stored energy. As the cord is pulled outwardly from the housing and is removed from the spool, additional spring energy is stored as the spool rotates, so that the cord can be subsequently retrieved within the housing. A sector on the inside of one housing member has a series of notches which cooperate with a flexible pawl fixed to the side of the spool. When the cord is pulled outwardly to a desired length, the pawl will drop into a sector notch to hold the spool against the spring force relative to the housing. A slight tension and release of the cord will remove the pawl from the sector to enable the spring to rotate the spool and retrieve the cord. Electrical continuity through the retraction device is provided by an inlet lead which extends into the housing and is connected to a pair of fixed contacts on the inner wall of the housing. The latter contacts engage a pair of conductive rings on the spool which in turn are connected to the ends of the cord attached to the spool. Thus, current flow through the retraction device is sustained even as the spool is rotated during cord extension and retraction.

Other objects, advantages and features of the invention will become apparent from the following detailed description of one embodiment thereof, presented in conjunction with the accompanying drawing.

BRIEF DESCRIPTION OF THE DRAWING

FIG. 1 is a view in perspective of an electrical cord retraction device according to the present invention, as it appears in a typical installation.

FIG. 2 is a front view in elevation and in section of the cord retraction device of FIG. 1 and taken along line 2—2 of FIG. 3.

FIG. 3 is a top plan view in partial section of the cord retraction device taken along line 3—3 of FIG. 2.

FIG. 4 is a view in elevation showing the interior of one housing section for the device of FIG. 1, with the pawl in phantom, shown in its locked position.

FIG. 5 is a view in elevation showing the interior of the other housing section for the device of FIG. 1.

FIG. 6 is a view in elevation and in section along the line 6—6 of FIG. 3 and showing the spool and its spring motor.

FIG. 7 is a view in rear elevation showing one side of the spool for the device of FIG. 1 with the attached pawl.

FIG. 8 is a view in elevation similar to FIG. 4 and showing the pawl in dotted lines in various operative positions.

FIG. 9 is an enlarged view in section taken along line 9—9 of FIG. 2 showing the spool within the housing with the spring motor removed.

FIG. 10 is an enlarged view in elevation showing details of the pawl for the device of FIG. 1.

DETAILED DESCRIPTION OF EMBODIMENT

With reference to the drawing, FIG. 1 shows a telephone cord retraction device 10 as it appears in use in a typical installation. As shown, the device 10 is preferably attached to a room wall 12 just above a conventional telephone line terminal connector, commonly known as a 'phone jack 14. A short cord 16 extends from one side of the device through an opening 17 to a standard receptacle on the jack. Extending from its other side through an opening 19 is an extendable/retractable telephone cord 18 comprised of the standard wire pair covered with an insulation material. This cord is connected by a conventional snap connecter to the telephone base 20 having a handset 22. The length of the cord 18 may vary, but for ample range in a more or less average sized room, a length of 30 feet can be provided. Thus, with the use of the cord 18, the telephone base with its handset can be moved to any convenient location in the room up to the total cord length, and when desired, the cord can be quickly retracted and returned to the device 10.

Details of the device 10 are shown in FIGS. 1-7. In general, it comprises a housing, preferably formed in two mating sections 24a and 24b from a suitable molded plastic material, such as polyethylene. The housing sections have thin, overlapping edge portions 25 that fit together along a peripheral parting line (see FIG. 9). Within the housing is a rotatable spool 26 having side flanges 28 and 30 and a cylindrical drum portion 32 within which is a coiled spring motor 34 (FIG. 6).

As shown in FIGS. 2 and 3, a pair of telephone wires 36 and 38 within the short cord 16 are separated within the housing and are attached to a pair of spaced apart spring contacts 40 and 42. Each of these contacts are mounted on an insulating spacer 44 fixed to the inside surface of the housing section 24a at preselected locations. One flange 28 of the rotatable spool 26 has a pair of concentric, radially spaced apart contact rings 46 and 48 as shown in FIG. 2. Each ring is made of a thin layer of conductive metal material which is bonded to the flange 28 or retained by a series of spaced apart plastic projections 49 that extend through holes in the rings and are riveted thereto. The inner end of the extendable cord 18 extends around the drum portion 32 of the spool and is fixed thereto so that its two telephone wires can be separated and attached to the contact rings 46 and 48 as indicated at 45 and 47. As the spool rotates, the spring-loaded contacts 40 and 42 maintain physical engagement with the rings 46 and 48, thereby transmitting electrical signals from the short cord 16 through the device 10 to the extendable cord 18.

As shown in FIG. 9, the spool 26 is supported for rotation within the housing by a shaft member 50 which extends through central openings in the spool flanges 28 and 30. This shaft member has end portions 53 that are flat-sided or triangular in cross-section which fit into a pair of recesses 52 and 54 that are formed in the inner wall surfaces of the two housing sections 24a and 24b. Between the opposite end portions of the shaft 50 is a central portion which is provided with a pair of circular flange members 55 and 57 that are located just inside and adjacent to the spool flanges 28 and 30, respectively, thereby serving to keep the spool centered within the housing. When the device is assembled, a pair of screws 56 extend through each housing section 24a and 24b and into the end of the shaft 50 to hold it in place and also hold the housing sections together.

As shown in FIG. 6, one end 58 of the coiled spring motor 34 has a sharp bend and fits within a slot 60 that extends along the central portion of the shaft 50. The other outer end 62 of the spring is also bent sharply and is retained in a longitudinal slot 64 in the spool drum 32. Thus, as the spool drum 32 rotates clockwise, as shown in FIG. 6, the spring tightens and stores potential energy for retracting the cord 18.

It is desired that the cord 18 be controllable so that it can be manually pulled out of the housing against the force of the spring motor and then stopped without any tension on the cord as the telephone is being used. Also, when desired the cord 18 should be retractable automatically in its housing by first applying some initial tension and then releasing the cord to allow the spring motor to exert its wind-up force. The aforesaid stop and release functions are accomplished by a cooperating notched sector 66 and a flexible pawl 68.

The sector 66 is formed as an integral molded element on the inner surface of the housing section 24b, as best shown in FIG. 4. As shown, the sector has essentially a semi-circular shape whose circular center is coincident with the center of the shaft. A series of notches 67 are spaced apart along its periphery which are engageable by the flexible pawl 68. This pawl, as shown in FIG. 7 is mounted on the outer surface of the spool flange 30. In order to accommodate the limited space available between the spool flange 30 and the housing section 24b, the pawl has a relatively small uniform thickness (e.g. 0.090 inches) along its length and this thickness is essentially the same as that of the sector 66. To provide the required strength, flexibility and durability of the pawl, it is preferably made from a plastic material such as nylon. As shown in greater detail in FIG. 10, the pawl has an outer end 70 having a rectangular shape, that is retained by a U-shaped retainer member 72 provided on the outer surface of spool flange 30. The pawl end 70 fits tightly within the retainer member 72, but can be readily removed and replaced if it should become damaged. Extending from an enlarged, movable inner end 73 of the pawl 68 is a sharper, tooth-shaped portion 74 having a shape and size which enables it to fit within a sector notch 67. A curved edge 75 on the backside of the enlarged inner end serves as a camming surface. The inner end 73 is connected to the fixed outer end portion 70 by a relatively thin, flexible, but durable leg portion 76. The retainer member 72 is located so that the pawl 68 is normally positioned with its inner end tooth-shaped portion 74 directed toward the circular center of the sector 66.

When the cord retraction device is assembled, the spool 26 is provided with its flange 28 removed. The shaft 50 is inserted through the spool flange 30 and the drum 32 so that its flat-sided end will fit within the recess 54 of housing section 24b. The ends of the spring motor are inserted into the slot 60 for the shaft 50 and slot 64 in the spool drum. Now, the flange 28 is attached to the spool drum, by means of a suitable cement material, and the inner end of the extendable cord 18 is connected to the conductive rings 46 and 48. Thereafter, the inner ends of the fixed conductor 16 are attached to the spring contacts 40 and 42 on the housing section 24a and this housing section can now be placed on the mating section 24b with the end of the shaft 50 within the housing recess 52. The screws 56 are now inserted into opposite ends of the shaft 50 through the two housing sections to hold the unit together.

The operation of the pawl 68 and sector 66 in controlling the retractions of the cord 18 may be best understood by reference to FIGS. 4 and 8. In FIG. 4, the pawl is shown within a sector notch 67, thereby holding the spool 26 in a fixed position and the extended cord 18 free from tension. To release the pawl, the cord 18 is first pulled a slight amount from a position "A" to cause rotation of the spool and thus the pawl in a clockwise direction, as shown in FIG. 8. This moves the pawl past the notched portion of the sector 66, thereby freeing it from the sector, as indicated at "B". Now, when the cord is released, the spring motor 34 rotates the spool to wind-up the cord as the pawl flexes and the curved backside 75 of its inner end portion 73 engages the sector but passes over the notches of the sector. The spring motor will continue to retract or wind-up the cord 16 until it hits a stop member 77 which can be attached to the cord near its outer end at any desired location.

When the cord is to be extended, it is pulled outwardly to the desired length and then slowly reversed. This causes the inner end portion of the pawl 68 to seek the nearest sector notch 67 and seat itself to retain the spool, as shown in FIG. 4. The pulling, setting and releasing of the cord 18 is thus accomplished with minimal effort, while the flexible pawl and sector serve as reliable and durable control elements.

The preferred embodiment described herein is intended to be purely illustrative, and not limiting of the scope of the invention. Other embodiments and variations will be apparent to those skilled in the art and may be made without departing from the essence and scope of the invention as defined in the following claims.

What is claimed is:

1. A telephone cord retraction device adapted for connection between a fixed telephone terminal and a movable telephone set, said device comprising:
    a housing comprising a pair of molded plastic housing sections that fit together along peripheral edge portions;
    a fixed conductor extending from said housing and adapted for connection with said telephone terminal;
    a rotatable spool in said housing comprising a central drum portion and flange members at opposite ends of said drum portion;
    an extendable cord on said spool whose outer end is connectable to a telephone set;
    connection means on said spool and said housing for providing electrical continuity between said fixed conductor and said extendable cord;
    a spring motor connected to said spool for urging it in one rotational direction to provide wind-up tension on the extendable cord
    spool control means for temporarily holding said spool stationary within said housing against the force of said spring motor and for releasing said spool to allow said motor to rotate said spool and thereby wind-up said cord within said housing, said spool control means comprising a generally semicircular sector, having a series of spaced apart notches along its outer edge and a flexible pawl engageable with said sector, said sector being integral with one said housing section on its inside surface and said pawl being fixed to one said flange of said spool, said pawl being of plastic material and having an outer end portion retained on said spool flange.

2. The device as described in claim 1 including a shaft member extending coincident with the rotational axis of said spool and having non-circular opposite end portions retained by said housing sections.

3. The device as described in claim 1 wherein said connection means comprises a pair of spring contacts fixed to the inside surface of one housing section, means for securing one end of said fixed conductor to said spring contacts, and a pair of concentric conductive rings on one said flange member for said spool, the end of said extendable cord on said spool being connected to said concentric rings, said spring contacts being positioned on said housing section so as to make constant contact with said rings as said spool rotates, thereby maintaining electrical continuity from said fixed telephone conductor to said extendable cord.

4. The device as described in claim 1 wherein said pawl has an enlarged inner end portion with a tapered tooth which is sized and shaped to fit within the notches of said sector, and an arcuate camming edge on one side of said tooth and said inner end portion.

5. The device as described in claim 4 including a relatively narrow and flexible member on said pawl which interconnects its enlarged inner and outer end portions.

* * * * *